Oct. 11, 1932.                H. W. KRANZ                1,881,690
                           VEHICLE WHEEL RIM
                          Filed June 16, 1930
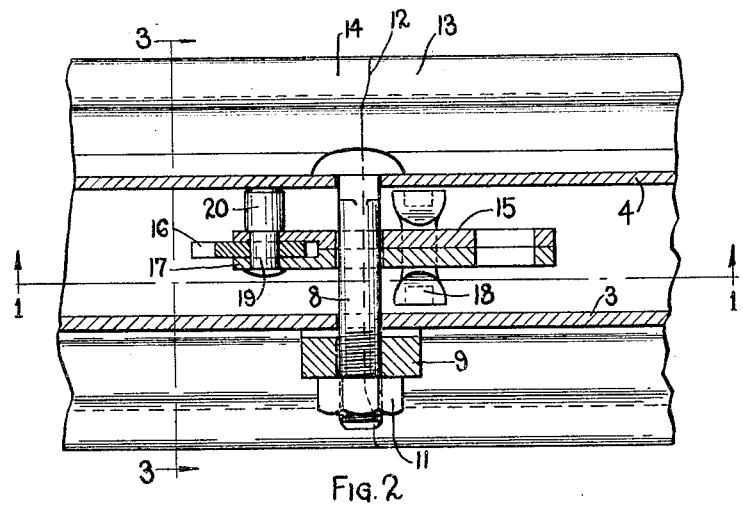
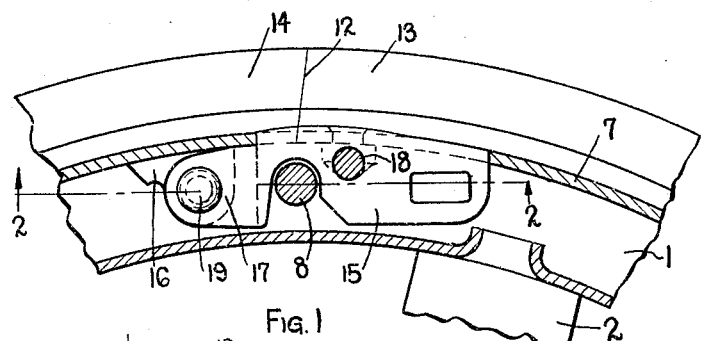
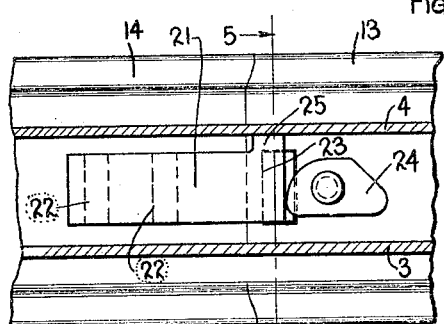
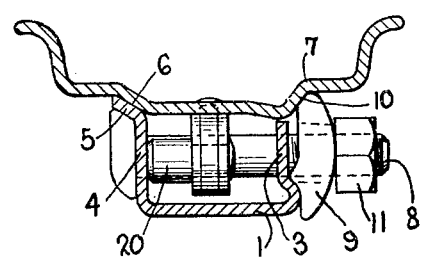
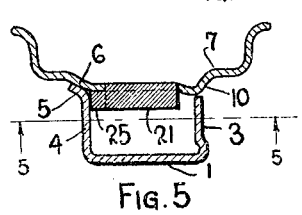
INVENTOR.
HARRY W. KRANZ
BY
Day, Oberlin + Day
ATTORNEYS Patented Oct. 11, 1932

1,881,690

UNITED STATES PATENT OFFICE

HARRY W. KRANZ, OF LAKEWOOD, OHIO, ASSIGNOR TO THE CLEVELAND WELDING CO., OF CLEVELAND, OHIO, A CORPORATION OF OHIO

VEHICLE WHEEL RIM

Application filed June 16, 1930. Serial No. 461,400.

This invention, relating as indicated, to vehicle wheel rims, has specific reference to so-called demountable rims and more especially to rims which are split transversely for the purpose of collapsing the same to facilitate the mounting and demounting of the tires carried thereby.

Considerable difficulty has been experienced in the past in the construction of transversely split demountable rims in that the splitting of the rim results in a weakened structure which, unless guarded or suitably supported, will cause such rim to be deformed during use. One method of supporting the rim in the split area so as to afford a suitable backing thereof, has been to have one of the rim-retaining lugs engage the opposite ends of the rim at the point of separation so that such lug will afford a substantial abutment for the adjacent ends of the split and thereby prevent any deformation of the rim due to such split.

The employment of lugs, or more specifically a single lug, which engages the rim on opposite sides of the split, has the tendency however, upon a tightening of the lug-securing bolts or nuts, to effect an excessive lateral movement of the split section of the rim relative to the felly, so that the ends of the rim on that side opposite the lug were spread apart presenting a gap of greater or less degree to the tire and the tube contained therein.

When flaps are used in connection with tires when mounted on vehicle rims, which flaps are interposed between the tubes and the outer periphery of the rim, the separation of the rim at the split causes little trouble due to the fact that such flaps are of sufficient strength to bridge such gap satisfactorily and prevent injury to the tube when inflated and during the life of the tire. Recently, however, it has been found advisable in connection with so-called drop center rims, and the like, to omit flaps in the tire, tube and rim assembly for reasons which are so well known that a reiteration at this point is believed unnecessary. The omission of the flap in the assembly places the bare tube in direct contact with the outer periphery of the rim so that extreme care must be employed in eliminating all possible sources of damage to the fragile tube structure during the operation of the wheel. The separation of the contiguous ends of the rim in the split area permits the tube, upon inflation, to be forced into such split so that during the running of the rim and the incidental relative movement of the two ends, the tube, if permitted to be forced into the gap between the adjacent rim ends will soon become damaged to the point of failure.

It is among the objects of this invention to provide a means in association with transversely split demountable rims so that any separation of such split will be entirely obviated regardless of the lateral pressure exerted upon such split rim by the lug removably securing the same to the felly or wheel structure. Other objects and advantages of this invention will appear as the description proceeds. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a fragmentary sectional view of a split rim, felly and wheel structure taken on a plane substantially at right angles to the axis of such wheel; Fig. 2 is a fragmentary sectional view of the structure illustrated in Fig. 1 taken on a plane substantially indicated by the line 2—2; Fig. 3 is a transverse sectional view of the structure illustrated in Fig. 2, taken on a plane substantially indicated by the line 3—3; Fig. 4 is a fragmentary sectional view similar to Fig. 2, showing an alternative form of the structure comprising my invention; and Fig. 5 is a transverse sectional view of the structure illustrated in Fig. 4 taken on a plane substantially indicated by the line 5—5.

Referring more specifically to the drawing, and more especially to Figs. 1 to 3, the wheel structure adapted to support a common form of transversely split demountable rim includes a felly 1 which is suitably mounted in any well known manner on the terminals of spokes 2 forming the wheel structure (not shown). The felly 1 has circumferential flanges 3 and 4, the latter being provided with a tapered seat 5 adapted to engage a similarly formed seat 6 on the inner periphery of a demountable rim 7. The demountable rim 7 is removably secured to the felly 1 by means of a plurality of circumferentially spaced bolts 8 which secure removable lugs 9 in proper engagement with the inner periphery of such rim. The lug 9 has a tapered seat 10 which is adapted to engage a similarly tapered seat on the inner periphery of the rim 7. By tightening the nuts 11 on the bolts 8, the lateral movement of the lug 9 will force the rim 7 onto the felly and will maintain such rim in proper assembled relation thereon during the operation of the wheel.

The rim 7 is split transversely as at 12, the contiguous ends 13 and 14 being brought together or separated during mounting or demounting of the tire by means of a latch member 15 which is pivotally secured at one terminal to the end 14 of the rim by means of an inwardly projecting lug 16 which is engaged by the bifurcated portion 17 of the latch 15. The latch 15 is pivotally supported on the terminal 13 of the rim by means of a clevis member 18 which passes through such latch member and is rigidly supported by the rim.

The pivot pin 19, by means of which pivotal connection is provided between the latch member 15 and the lug 16, extends for some distance laterally of the latch as at 20 and for such a distance, so that when the nut 11 is tightened on the bolt 8, excessive axial movement of the rim at this point will be prevented by the stop 20.

Any form of latch may be employed instead of the one here specifically illustrated as, for instance most clearly shown in Figs. 4 and 5, the latch may be of the common form which simply consists of a flat strap 21 secured to the end 14 of the rim by rivet members as 22 and has a radially extending flange 23 which is engaged by an aperture formed therefor in the end 13 of the rim 7. Engagement of the flange 23 by the aperture in the end 13 of the rim is insured by a pivotally mounted member 24 which may be swung into or out of engagement with a shoulder on the terminal of the strap 21 during mounting or demounting of the tire. The strap 21 has a lug 25 preferably formed integrally therewith and extending axially of the rim away from the lug 9 so that, upon tightening of the lug 9, excessive axial movement of the rim will be prevented by such stop coming in contact with the felly wall 4.

From the foregoing, it will be seen that any excess axial movement of the rim with respect to the wheel in the region of the split will not result in separation of the contiguous ends of the split rim, and an even surface is assured for the tube on such rim.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with a vehicle wheel having a felloe, of a transversely split demountable rim secured thereon, a latch for collapsing said rim and for securing together the ends thereof, and a pivot pin for said latch comprising a stop adapted to engage said felloe for preventing the separation of the ends of said rim on one side thereof as such rim is forced on said felloe from the other side thereof.

2. A vehicle wheel having a channel-section felloe, a transversely split tire-carrying rim demountably securable on said felloe, latch-means extending from one to the other contiguous end of the split rim, transversely-drawing means for clamping said rim to said felloe, and means for preventing said last-named means from causing separation of the contiguous ends of said rim, said means comprising a stop in general alignment laterally with the latch-means to engage the unbroken wall surface of said channel-section felloe.

3. A vehicle wheel having a channel-section felloe, a transversely split tire-carrying rim demountably securable on said felloe, latch-means extending from one to the other contiguous end of the split rim, transversely-acting means for clamping said rim to said felloe, and means for preventing said transversely-acting means from causing separation of the contiguous ends of said rim, said means comprising a stop connected with the latch-means within said channel-section felloe and adapted to abut a plane surface of the inner wall thereof.

Signed by me this 12 day of June, 1930.

HARRY W. KRANZ.